United States Patent
Nelson

[15] 3,665,950
[45] May 30, 1972

[54] VARIABLE BACK PRESSURE CHECK VALVE AND DRAIN VALVE

[72] Inventor: Thomas A. Nelson, South Bend, Ind.
[73] Assignee: The Bendix Corporation
[22] Filed: July 13, 1970
[21] Appl. No.: 54,416

[52] U.S. Cl..............................137/107, 137/115, 137/116.3
[51] Int. Cl......................................F16k 11/22, F02h 55/00
[58] Field of Search................137/107, 102, 115, 116.3, 116

[56] References Cited

UNITED STATES PATENTS

| | | | |
|---|---|---|---|
| 2,969,806 | 1/1961 | Jensen | 137/107 |
| 3,102,549 | 9/1963 | Worden | 137/116.3 |
| 3,309,149 | 3/1967 | Bueler | 137/116 |
| 3,446,230 | 5/1969 | Swedberg | 137/115 |

Primary Examiner—Samuel B. Rothberg
Assistant Examiner—William H. Wright
Attorney—Gordon H. Chenez and Plante, Hartz, Smith and Thompson

[57] ABSTRACT

A fluid receiver is connected via a supply orifice to a pressurized fluid supply source and via a fluid drain orifice to a relatively low pressure fluid drain source. A fluid pressure responsive spring-loaded check valve connected to the supply orifice and a drain valve connected to the drain orifice are provided with a one way collapsible link including a compression spring connecting the same causing the drain valve to open when the check valve is fully closed and close in response to compression of the spring when the check valve moves a predetermined distance in an opening direction. The check valve is provided with a contoured end portion and parallel flow passages in series flow therewith. One of the parallel flow passages includes a venturi for generating a fluid pressure which varies as a function of the flow therethrough and which is imposed on the check valve to assist the spring force acting thereagainst.

9 Claims, 2 Drawing Figures

Patented May 30, 1972

3,665,950

INVENTOR.
THOMAS A. NELSON
BY
Gordon N. Cheney
AGENT

VARIABLE BACK PRESSURE CHECK VALVE AND DRAIN VALVE

BACKGROUND OF THE INVENTION

This invention pertains to a combination check and drain valve particularly of the type utilized in controlling pressurized fuel flow to and draining of fuel from a fuel manifold of a combustion engine.

The conventional combustion engine fuel system may include a fuel pressure responsive check valve adapted to restrict flow of fuel to a fuel manifold downstream therefrom until a predetermined fuel pressure is reached at which time the check valve opens to pressurize the fuel manifold with fuel. The fuel pressure at which the check valve opens is normally determined by a predetermined fixed spring load imposed against the check valve to urge the same closed which, in turn, requires a predetermined fuel pressure drop across the check valve to hold the same open. Once open, the check valve is incapable of exercising any reasonably significant control over the flow of fuel therethrough to the fuel nozzles which control, in certain engine fuel control systems, may be desirable. Furthermore, in the case of aircraft, engine fuel requirements normally vary over a wide range with the fuel requirement decreasing with increasing flight altitude as will be recognized by those persons skilled in the art. At low fuel flows, the check valve may be subject to unstable operation in that the force tending to hold the valve open may not greatly exceed the opposing spring force tending to close the check valve.

SUMMARY OF THE INVENTION

The present invention provides fluid flow control means having a check valve portion for venting pressurized fluid flow to a receiver and a drain valve portion for venting the receiver to a relatively lower pressure fluid source. The check valve portion is resiliently loaded to a closed seated portion and is provided with a fluid pressure responsive member responsive to a variable control fluid pressure derived from the fluid pressure drop across the check valve as the check valve moves in an opening direction. At high fluid flows, the check valve is actuated to a fully open position thereby presenting little restriction to fluid flow therethrough. At relatively lower fluid flows, the check valve moves toward a closed position whereupon a contoured portion thereof becomes effective to establish a variable effective flow area which decreases to restrict flow therethrough accordingly. When the fluid pressure upstream from the check valve drops to a predetermined value, the check valve moves to a closed position thereby allowing the drain valve to open and vent the receiver to the lower pressure fluid source.

It is an object of the present invention to provide a fluid flow check valve and control means for generating a variable force loading against the check valve to vary the effective flow therethrough.

It is another object of the present invention to provide a compact and reliable combination check valve and drain valve.

DESCRIPTION OF THE PREFERRED EMBODIMENT

Figure 1:
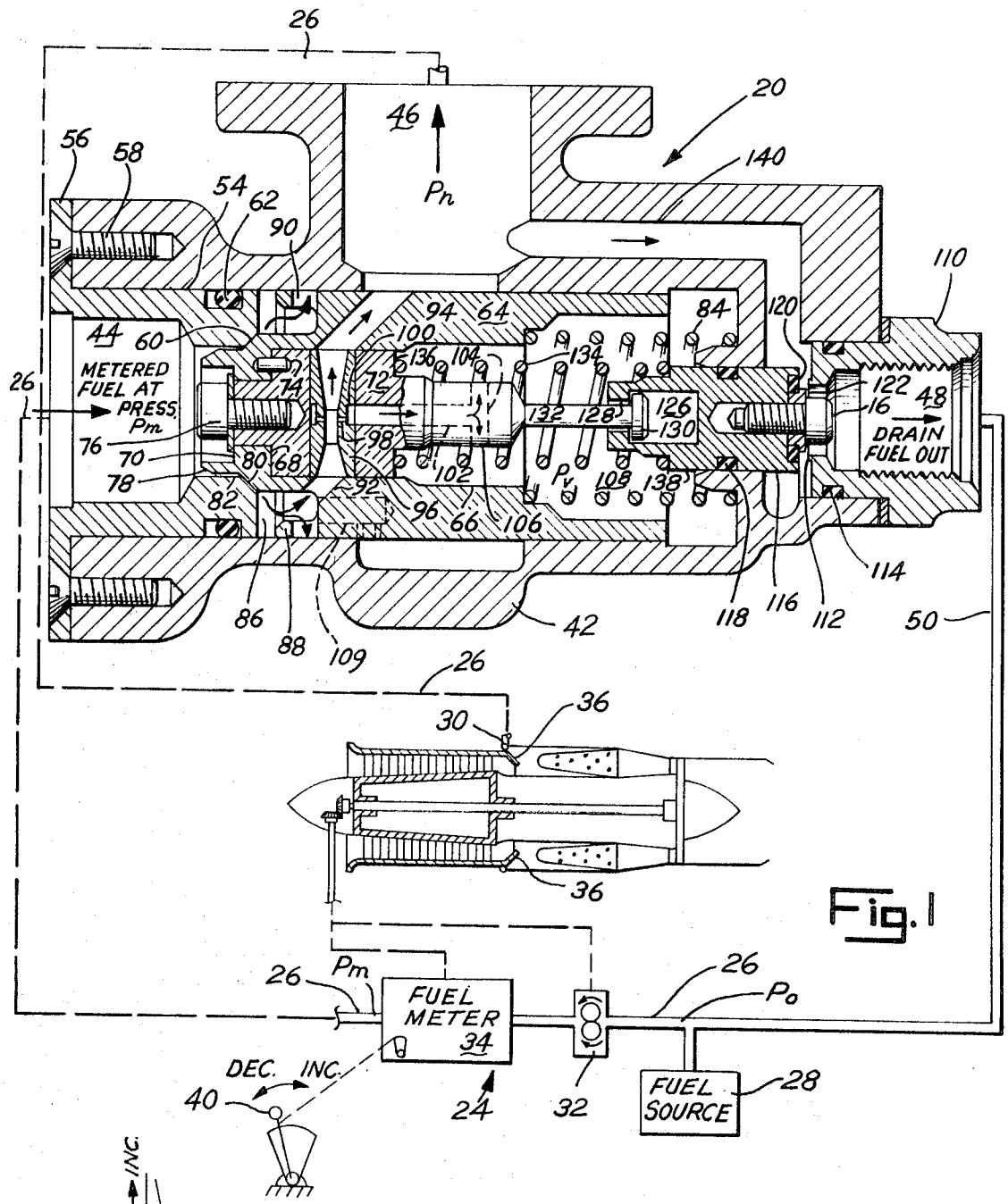
FIG. 1 illustrates a sectional schematic view of the present invention as embodied in a conventional fuel system for a gas turbine engine.

Referring to the drawing, numeral 20 designates the present invention shown in combination with a conventional gas turbine engine 22 fuel system generally indicated by 24. The fuel system 24 includes a fuel supply conduit 26 connecting a fuel tank 28 with an annular fuel manifold 30 mounted on engine 22. An engine driven fuel pump 32 and fuel meter 34 downstream therefrom are disposed in conduit 26 and serve to generate a controlled flow of pressurized fuel through conduit 26 to fuel manifold 30 from which the pressurized fuel is injected via a plurality of fuel nozzles 36 to associated combustion chambers 38. The controlled flow may vary as a function of one or more variable conditions of engine operation such as engine speed and the position of an engine power output control lever 40 suitably connected to fuel meter 34.

As pointed out heretofore, the rate of fuel flow to manifold 30 should be maintained above a predetermined minimum value to establish satisfactory fuel pressurization of manifold 30 and thus pressure differential across fuel nozzles 36 depending upon the range of combustion chamber gas pressure to which the fuel nozzles discharge over the operating range of the engine. To that end, applicant's check and drain valve 20 is disposed in conduit 26 downstream from fuel meter 34 and serves to block fuel flow to fuel manifold 30 as necessary to prevent inadequate pressurization of manifold 30 as well as drain fuel from manifold 30 under engine shut down conditions in a manner to be described.

The check and drain valve 20 includes a casing 42 having an inlet port 44 and an outlet port 46 in series flow relationship with conduit 26. A drain port 48 in casing 42 is connected via a passage 50 to fuel conduit 26 at relatively low fuel pump inlet pressure $P_o$ upstream from fuel pump 32. The inlet port 44 is defined by a sleeve member 52 slidably received by a bore 54 in casing 42 and provided with a flanged portion 56. A plurality of screws 58 extend through flanged portion 56 into threaded engagement with casing 42 to removably secure sleeve member 52 in position in casing 42. The sleeve member 52 is provided with a reduced diameter section defining a valve seat 60 and is suitably recessed to receive an "O" ring seal 62 to prevent fuel leakage between adjacent surfaces of sleeve member 52 and casing 42.

A check valve member 42 slidably carried in bore 54 is provided with a longitudinal bore 66 reduced in diameter at one end thereof to form spaced-apart shoulders 68 and 70. A plug 72 slidably received by bore 66 bears against shoulder 68 and is fixed in position rotationally relative thereto by a locating pin 74 suitably retained by shoulder 68 and plug 72. The plug 72 is secured in position by a screw member 76 threadedly engaged with plug 72 and adapted to bear against shoulder 70.

A bevelled end portion 78 formed on check valve member 64 is separated from a bevelled portion 80 by a land 82 which is slidably received by the reduced diameter section of sleeve member 52 to permit bevelled portion 80 to engage valve seat 60 under the influence of a compression spring 84 interposed between check valve member and casing 42. An annular chamber 86 partially defined by a skirt portion 88 of check valve member 64 is adapted to receive fuel from inlet port 44 and communicate with outlet port 46 via a plurality of circumferentially spaced-apart openings 90 in skirt portion 88 as will be described. The annular chamber 86 further communicates with outlet port 46 via diametrically opposed passages 92 and 94 in check valve member 64 and an orifice or venturi 96 suitably secured in plug 72 and connecting passages 92 and 94. Venturi 96 throat pressure $P_v$ is vented via associated radial passages 98 and annulus 100 to an axial passage 102 and radial passages 104 formed in a reduced diameter portion 106 of plug 72 which radial passages 104 communicate with a chamber 108 partially defined by plug 72 and check valve member 64. One or more restricted passages 109 in check valve member 64 and in parallel flow relationship with venturi 96 connects recess 86 with outlet 46.

The drain port 48 is defined by a sleeve member 110 suitably secured in casing 42 as by a press fit and an annular valve seat 112 formed thereon. The sleeve member 110 is suitably recessed to accommodate an "O" ring seal 114 to establish a fluid seal between adjacent surfaces of casing 42 and sleeve member 110. A drain valve 116 slidably carried by casing 42 is suitably recessed to accommodate an "O" ring seal 118 to establish a fluid seal between adjacent surfaces of casing 42 and drain valve 116. One end of drain valve 116 is recessed to accommodate an annular-shaped resilient seal 120 which is secured in position by a retainer 122 through which a lock screw 124 extends into threaded engagement with drain valve 116. The opposite end of drain valve 116 is provided with an axially extending circular recess 126 having a radially inwardly extending shoulder 128 at the open end thereof. The recess 126 is adapted to slidably receive an enlarged diameter portion or stop 130 of a stem 132 integral with plug 72. A compression spring 134 interposed between retaining shoulders 136 and 138 formed on plug 72 and drain valve 116, respectively, serves to urge the same apart causing stop portion 130 to engage shoulder 128 as shown in the drawing thereby holding drain valve 116 in its open position which, in turn, vents drain port 48 to a passage 140 leading from outlet port 46.

OPERATION OF THE PREFERRED EMBODIMENT

Assuming the control lever 40 to be in a fuel cut-off position, fuel meter 34 will block fuel flow through conduit 26 thereby rendering the engine 22 inoperative. Under such a condition, it is desirable to vent the manifold 30 to a relatively low pressure fuel source to drain the fuel manifold and avoid undesirable fuel dribble through the fuel nozzles 36 into combustion chambers 38. To that end, the check valve 72 and drain valve 116 are urged to the positions shown in FIG. 1 by the compression spring 84 which seats valve 72 against seat 60 and compression spring 134 which urges drain valve 116 away from check valve 72 causing shoulder 128 to engage stop 130. It will be noted that the stop 130 prevents drain valve 116 from closing thereby venting the manifold 30 to drain fuel pressure $P_o$ to drain fuel from manifold 30.

Now, assuming the control lever 40 to be actuated to a position requesting engine operation at a maximum power output, the fuel meter 34 establishes a corresponding flow of pressurized fuel at pressure $P_m$ through conduit 26 to inlet 44. The fuel at pressure $P_m$ acts against closed valve member 64 in opposition to the force of spring 84 plus the force of relatively low drain fuel pressure $P_o$ in chamber 108 derived from the throat of venturi 96. The resulting force unbalance urges check valve 72 in an opening direction thereby unseating the same from valve seat 60. The land 82 is sized to provide a relatively loose sliding fit thereof with casing 42 such that unseating valve 72 permits fuel to pass through the annular clearance defined by land 82 into recess 86 from which the fuel flows through restricted passages 109 and venturi 96 to outlet 46. The effective flow areas of venturi 96 and passages 109 are relatively large compared to that of the annular clearance defined by land 82 and adjacent casing 42 such that the major restriction to fuel flow and thus pressure differential between inlet 44 and outlet 46 occurs at the land 82.

Figure 2:
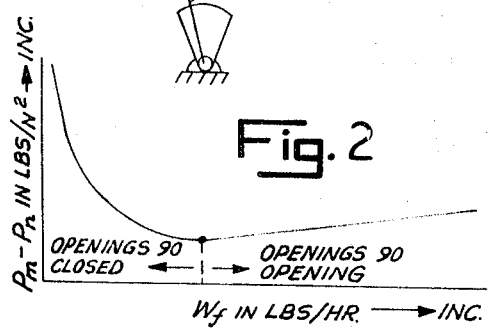
FIG. 2 is a curve showing the relationship between metered fuel flow, $W_f$, at pressure $P_m$ and the fuel pressure differential, $P_m - P_n$, between metered fuel and the combustion chamber fuel nozzle fuel pressure, $P_n$.

Since the drain valve 116 is held fixed in position relative to valve member 64 by spring 134, the drain valve 116 moves toward seat 112. As bevelled end portion 78 moves axially into alignment with valve seat 60, the drain valve 116 moves into engagement with seat 112 which compresses resilient seal 120 to a predetermined extent thereby establishing a positive seal against flow from passage 140 to passage 50 at pressure $P_o$. The valve member 64 continues to move under the influence of pressure $P_m$ thereby defining a progressively increasing annular flow area by virtue of the decreasing effective diameter of bevelled end portion 78 which, in turn, results in increased fuel flow to recess 86. As the effective flow area defined by bevelled end portion 78 increases, the venturi 96 senses the fuel flow from inlet 44 to outlet 46 with the resulting throat pressure $P_t$ generated at venturi 96 varying substantially as a function of the pressure drop from inlet 44 to outlet 46. The resulting throat pressure of venturi 96 increases but at a lesser rate than the downstream pressure $P_N$ and is transmitted to chamber 108 where the increased force derived therefrom tends to oppose opening movement of valve 64 which, in turn, presents increased resistance to fuel flow through check valve 64 and thus a corresponding increased pressure drop between inlet 44 and outlet 46. However, it will be understood that the pressure drop between inlet 44 and outlet 46 although increasing is still significantly less at any given fuel flow rate than would occur if the venturi 96 was not present. The small diameter end of bevelled portion 78 moves into radial alignment with the adjacent edge of seat 60 at which position of valve 64 the openings 90 of skirt portion 88 begin to register with outlet 46. As the effective area of openings 90 increases thereby venting fuel to outlet 46 in parallel to that through venturi 96, the pressure drop between inlet 44 and outlet 46 for a given fuel flow rate varies substantially linearly as shown in the curve of FIG. 2. It will be noted from FIG. 2 that the openings 90 become effective at a predetermined fuel flow rate above which the pressure drop vs fuel flow rate relationship is linear and below which the pressure drop vs fuel flow rate relationship is a square function.

Upon movement of check valve 64 to a position establishing maximum flow area of openings 90, a maximum fuel flow rate is established corresponding to the desired maximum power output of the engine.

It will be recognized that a reversal in the above-described fuel flow rate trend, i.e., in a decreasing direction from maximum, will result in a like predetermined pressure drop between inlet 44 and outlet 46 for each fuel flow rate as indicated in FIG. 2.

The variable back pressure against fuel flow established by check valve 64 is particularly useful in providing a fuel flow derichment effect on the fuel meter 34. To that end, the variable back pressure imposed on metered fuel pressure at $P_m$ by the check valve 64 may be sensed by suitable conventional fuel pressure sensitive apparatus, not shown, in the fuel meter 34 to generate a corresponding reduction in the fuel flow rate established by fuel meter 34. Such a fuel flow derichment effect may be desirable in providing a fuel flow decrease as a function of increasing flight altitude.

I claim:

1. A variable back pressure fluid flow check valve comprising:
    a casing having an inlet connected to receive pressurized fluid at a variable flow rate and an outlet connected to a fluid receiver;
    check valve means operatively connected to said inlet and outlet for controlling the effective flow area therebetween and thus the fluid pressure drop therebetween;
    resilient means operatively connected to said valve means for imposing a predetermined force preload thereon tending to close the same in opposition to force derived from said pressurized fluid acting against said valve means;
    fluid flow responsive means operatively connected in series flow relationship with said inlet and outlet for generating a control fluid pressure which varies as a function of the fluid pressure drop between said inlet and outlet; and
    force producing means responsive to said control fluid pressure operatively connected to said valve means for imposing a force thereon to augment said resilient means.

2. A variable back pressure fluid flow check valve as claimed in claim 1 and further including:
    a drain port in said casing connected to a relatively low pressure fluid drain source;
    normally closed drain valve means operatively connected to said outlet and said drain port for establishing and disestablishing fluid communication therebetween; and
    means operatively connecting said check valve means and said drain valve means for actuating said drain valve means to an open position in response to movement of said check valve means to a closed position and to a closed position in response to movement of said check valve means to an open position.

3. A variable back pressure fluid flow check valve as claimed in claim 1 wherein:

said check valve means is slidably carried in said casing and provided with first and second valve portions operative with said inlet and outlet, respectively, to define corresponding first and second variable flow areas;

conduit means including said fluid flow responsive means in series flow relationship with said first valve portion and in parallel flow relationship with said second valve portion;

said check valve means being operative over a first range of positions wherein said first valve portion is open and said second valve portion is closed with the resulting fluid flow through said inlet passing through said conduit means to said outlet and a second range of positions wherein said first valve portion is open and said second valve portion is open with the resulting fluid flow through said inlet passing through said second valve portion and said conduit means to said outlet.

4. A variable back pressure fluid flow check valve as claimed in claim 1 wherein:

said inlet defines an annular valve seat;

said check valve means is slidably carried in said housing and provided with a contoured end having a portion thereof adapted to seat on said valve seat to block said inlet;

a chamber formed in said housing downstream from said inlet;

a skirt formed on said check valve means and provided with a plurality of openings therein communicating with said chamber and adapted to register with said outlet to a varying degree depending upon the position of said check valve means;

a passage in said check valve means connecting said chamber with said outlet in parallel to said plurality of openings;

said fluid flow responsive means being disposed in said passage means and responsive to fluid flow therethrough;

said check valve means being actuable off said valve seat and having a first range of positions wherein said contoured end portion establishes a variable effective flow area of said inlet with said plurality of openings blocked and a second range of positions wherein said plurality of openings register with said outlet to vent fluid from said chamber to said outlet in parallel with fluid flow through said passage.

5. A variable back pressure fluid flow check valve as claimed in claim 4 wherein:

said resilient means is a compression spring urging said check valve means into seating engagement with said valve seat; and said force producing means being defined by a predetermined effective area of said check valve means exposed to said control fluid pressure for generating a variable force augmenting said compression spring.

6. A variable back pressure fluid flow check valve as claimed in claim 2 wherein:

said means operatively connecting said check valve means includes a stop member fixedly secured to said check valve means and movable therewith;

said drain valve means being slidably carried on said check valve means and engageable with said stop member to limit the movement of said drain valve means relative to said check valve means; and a compression spring interposed between said check valve means and said drain valve means for urging said drain valve means into engagement with said stop member.

7. A variable back pressure fluid flow check valve as claimed in claim 2 wherein:

said pressurized fluid is a controlled flow of fuel for a combustion engine;

said fluid receiver is a fuel manifold connected to supply said fuel to combustion chambers of the combustion engine; and said relatively low pressure fluid drain source is a source of fuel.

8. A variable back pressure fluid flow valve as claimed in claim 6 wherein:

said inlet and said drain port are arranged in spaced apart co-axial relationship;

said check valve means and said drain valve means are arranged in spaced apart coaxial relationship and interposed between said inlet and said drain port in axial alignment therewith.

9. A variable back pressure fluid flow check valve as claimed in claim 3 wherein:

said fluid flow responsive means is a venturi wherein said control fluid pressure generated thereby varies as a function of fluid flow therethrough and thus the fluid pressure drop thereacross.

* * * * *